May 8, 1923.
C. N. TEETOR
ASSEMBLING TOOL
Filed Nov. 3, 1921
1,454,349
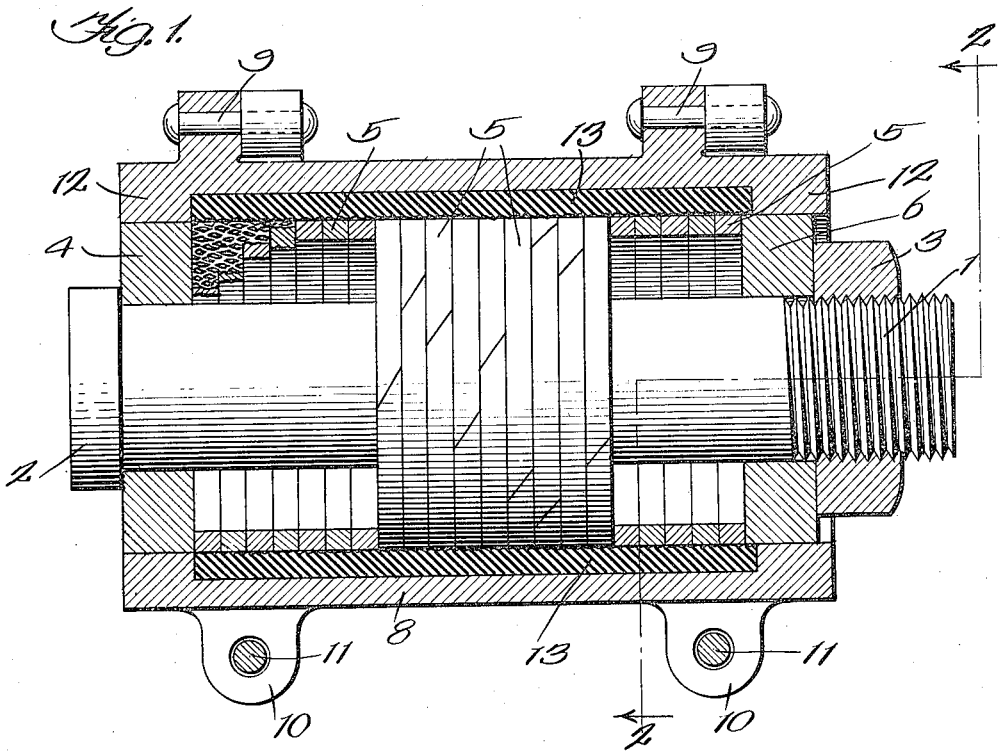
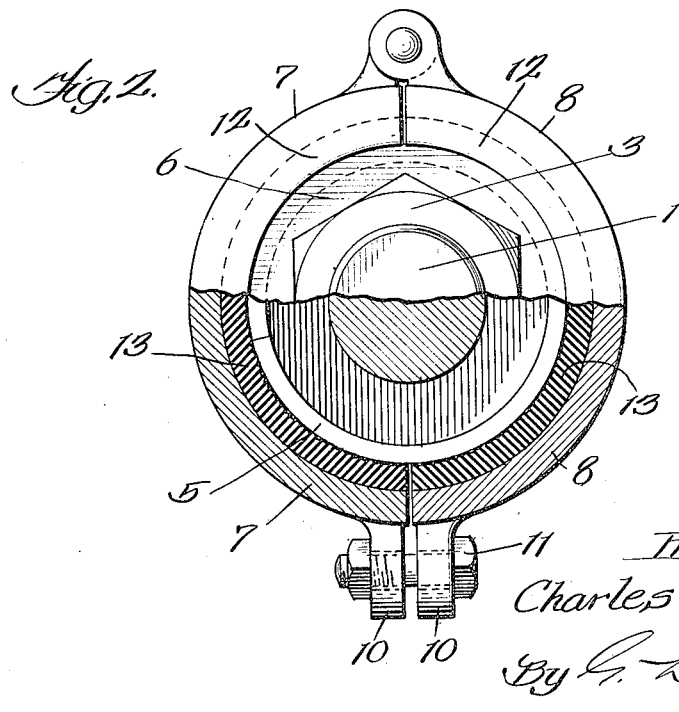
Inventor:
Charles N. Teetor
By G. L. Gragg
Atty.

Patented May 8, 1923.

1,454,349

UNITED STATES PATENT OFFICE.

CHARLES N. TEETOR, OF HAGERSTOWN, INDIANA.

ASSEMBLING TOOL.

Application filed November 3, 1921. Serial No. 512,497.

*To all whom it may concern:*

Be it known that I, CHARLES N. TEETOR, citizen of the United States, residing at Hagerstown, in the county of Wayne and State of Indiana, have invented a certain new and useful Improvement in Assembling Tools, of which the following is a full, clear, concise, and exact description.

My invention relates to tools that are employed for assembling work, such as piston rings, preparatory to the machining or other treatment thereof.

The tool of my invention includes a tubular shell divided lenghwise into sections, the shell having an inner preferably substantially cylindrical lining of resilient cushioning material, means for clamping the sections of the shell together, a plate at each end of the shell and means for clamping said end plates toward each other to hold contents of the shell when the shell sections are unclamped. In the preferred embodiment of the invention the shell is formed with an annular shoulder at each end that projects beyond and is co-axial with the lining, the end plates being circular and being surrounded by and having the diameter of the shoulders respectively individual thereto. These end plates thus not only serve to hold the contents of the shell when the shell is loosened but also serve to define the diameter to which the shell is to be contracted. The means for clamping the end plates toward each other when the shell is loosened is desirably in the form of an arbor having a head at one end and a nut in threaded connection with its other end, the end plates being clamped between the head and nut by tightening the nut.

The tool of my invention is of particular service when employed for assembling cast piston rings. Before these piston rings are located upon the tool they are merely parted, it being unnecessary to perform any other operation upon the piston rings prior to their assembly with the tool. The split sleeve serves to contract the rings until the gaps at their partings are closed whereafter the rings are clamped together at the end plates preparatory to the loosening and removal of the shell. The rings thus held in assembly between the end plates are then placed in a lathe and turned down to the desired diameter. The tool of my invention enables me to reduce the number of operations that were hitherto employed in the manufacture of piston rings.

I will explain my invention more fully by reference to the accompanying drawing showing the preferred embodiment of my invention and in which Fig. 1 is a longitudinal sectional elevation of the device; Fig. 2 is a sectional view on line 2—2 of Fig. 1.

Like parts are indicated by similar characters of reference throughout the different figures.

The preferred form of tool includes the arbor 1 having a head 2 at one end and a nut 3 in threaded connection with the other end. The ends of the arbor are suitably formed for reception between the head and tail stocks of a lathe. The circular end plate 4 is at the head end of the arbor, in the use of the tool. The piston rings 5, after having been parted, are threaded upon the arbor in proper number. The end plates 6 at the threaded end of the arbor is then placed on the arbor whereafter the nut 3 is screwed upon the arbor to bring the plate 6 approximately to its final position but without tightly pressing the plate against the clamping rings so as to leave these rings free for the final adjustment which the centering shell is to have thereupon.

In the preferred embodiment of the invention, such centering shell is divided lengthwise into two sections 7 and 8 that are preferably in permanent hinged connection by means of hinges 9 at one side of the shell, the shell sections at the other side of the shell being formed with lugs 10 through which clamping bolts 11 are passed to bring the shell into its completely closed position. Both plates 4 and 6 are desirably of the same diameter and the adjacent ends of the shell are formed with annular shoulders 12 whose internal diameter equals that of the plates when the shell is closed. The shell is provided with an inner substantially cylindrical lining 13 of resilient cushioning material, preferably rubber, that is sufficiently hard to effect movements of the piston rings in the planes of these rings to secure the proper relative adjustment of the rings on the arbor, yet, which is sufficiently resilient and cushionlike to receive the minor inequalities in the peripheries of the rings as they come from the casting molds. The lining 13 is substantially cylindrical, when the shell is closed, and is co-axial with the arbor 1 and the plates 4 and 6. When the sections of the shell are closed together to an extent limited by the plates 4 and 6 the rings are contracted to close the gaps at the partings thereof whereupon the nut 3 is tightened to clamp the rings between the plates 4 and 6 to hold them contracted, whereafter the shell is subsequently loosened and removed. When thus held in assembly by the end plates independently of the shell they may be placed between the head and tail stocks of a lathe by suitably connecting the arbor 1 at one end with the head stock and suitably supporting it at its other end upon the tail stock, all in a manner which is well understood.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a tubular shell divided lengthwise into sections, said shell having an inner substantially cylindrical lining of resilient cushioning material and being formed with an annular shoulder at each end projecting beyond and co-axial with said lining; of a circular plate at each end of the shell and surrounded by and having the diameter of the adjacent annular shoulder; clamping means for closing the sections of said shell upon said end plates; and means for clamping said end plates toward each other to hold contents of the shell when the shell sections are unclamped.

2. The combination with a tubular shell divided lengthwise into sections, said shell having an inner substantially cylindrical lining of resilient cushioning material; of means for clamping the sections of the shell together; a plate at each end of the shell; and an arbor upon which said end plates are disposed and which is co-axial with the lining of the shell when the sections of the shell are clamped together, said arbor having a head at one end and a nut in threaded connection with its other end between which said end plates may be clamped to hold the shell contents when the shell sections are unclamped.

3. The combination with a tubular shell divided lengthwise into sections, said shell having an inner lining of resilient cushioning material; of means for clamping the sections of the shell together; a plate at each end of the shell; and means for clamping said end plates toward each other to hold contents of the shell when the shell sections are unclamped.

In witness whereof, I hereunto subscribe my name this 27 day of October, A. D., 1921.

CHARLES N. TEETOR.